US010963847B2

(12) United States Patent
Green et al.

(10) Patent No.: US 10,963,847 B2
(45) Date of Patent: Mar. 30, 2021

(54) TRACKING AND MANAGING GROUP EXPENDITURES

(71) Applicant: GOOGLE LLC, Mountain View, CA (US)

(72) Inventors: Travis Harrison Kroll Green, San Francisco, CA (US); Narelle Cozens, New York, NY (US); Peter Schmitt, Jersey City, NJ (US); Michael DePasquale, Rutherford, NY (US); Avery Pennarun, New York, NY (US); Boris Mizhen, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/563,438

(22) Filed: Sep. 6, 2019

(65) Prior Publication Data

US 2019/0392404 A1      Dec. 26, 2019

Related U.S. Application Data

(63) Continuation of application No. 13/436,491, filed on Mar. 30, 2012, now Pat. No. 10,410,184.

(51) Int. Cl.
*G06Q 20/02*     (2012.01)
*G06Q 10/10*     (2012.01)
*G06Q 30/06*     (2012.01)
*G06Q 40/02*     (2012.01)

(52) U.S. Cl.
CPC .......... *G06Q 20/023* (2013.01); *G06Q 10/10* (2013.01); *G06Q 30/06* (2013.01); *G06Q 40/02* (2013.01)

(58) Field of Classification Search
CPC ...... G06Q 20/384; G06Q 40/12; G06Q 30/04; G06Q 20/10
USPC ......................................................... 705/39
See application file for complete search history.

(56) References Cited

U.S. PATENT DOCUMENTS

| 7,343,335 | B1 | 3/2008 | Olliphant |
| 8,326,770 | B1 | 12/2012 | Weisman |
| 8,700,526 | B1 | 4/2014 | Cozens et al. |
| 9,123,038 | B2 | 9/2015 | Cozens et al. |

(Continued)

FOREIGN PATENT DOCUMENTS

| CN | 102339430 A | 2/2012 |
| JP | 2003-016231 A | 1/2003 |

(Continued)

OTHER PUBLICATIONS

Alcaidinho "Tech to Help Keep the Peace With Your Roommate," Apartment Therapy, Sep. 20, 2011, 3 pages.

(Continued)

*Primary Examiner* — Clifford B Madamba
(74) *Attorney, Agent, or Firm* — Dority & Manning, P.A.

(57) ABSTRACT

A group including plurality of users is established. A transaction record is maintained for the group that includes a plurality of payment transactions. Each of the plurality of payment transactions involves at least one user of the group. Additionally, a balance is maintained that indicates an amount owed by a first user of the group to a second user of the group based on one or more of the plurality of payment transactions. When a settling event occurs, the balance is settled by initiating a transfer of funds between the first user and the second user.

20 Claims, 5 Drawing Sheets

(56) References Cited

U.S. PATENT DOCUMENTS

| | | | |
|---|---|---|---|
| 2003/0233321 A1 | 12/2003 | Scolini et al. | |
| 2006/0085259 A1 | 4/2006 | Nicholas et al. | |
| 2007/0061260 A1* | 3/2007 | deGroeve | G06Q 40/12 705/44 |
| 2008/0086261 A1 | 4/2008 | Robinson et al. | |
| 2008/0119162 A1 | 5/2008 | Sivalingam et al. | |
| 2008/0189189 A1 | 8/2008 | Morgenstern | |
| 2008/0195510 A1 | 8/2008 | Olliphant | |
| 2008/0255989 A1 | 10/2008 | Altberg et al. | |
| 2009/0012895 A1 | 1/2009 | Mehrabi | |
| 2009/0119190 A1 | 5/2009 | Realini | |
| 2009/0152343 A1 | 6/2009 | Carter et al. | |
| 2009/0233629 A1 | 9/2009 | Jayanthi | |
| 2010/0121745 A1* | 5/2010 | Teckchandani | G06Q 20/10 705/30 |
| 2011/0106675 A1 | 5/2011 | Perlman | |
| 2012/0143761 A1 | 6/2012 | Doran et al. | |
| 2012/0150731 A1 | 6/2012 | Isaacson et al. | |
| 2012/0166332 A1 | 6/2012 | Naaman | |
| 2012/0173396 A1* | 7/2012 | Melby | G06Q 30/04 705/34 |
| 2012/0185383 A1* | 7/2012 | Demark | G06Q 30/0613 705/40 |
| 2012/0233015 A1 | 9/2012 | Calman et al. | |
| 2012/0265678 A1 | 10/2012 | Ross et al. | |
| 2013/0006788 A1 | 1/2013 | Zhou et al. | |
| 2013/0041824 A1 | 2/2013 | Gupta | |
| 2013/0173456 A1 | 7/2013 | Grigg et al. | |
| 2013/0262294 A1 | 10/2013 | Green et al. | |
| 2014/0156521 A1 | 6/2014 | Cozens et al. | |
| 2016/0042330 A1 | 2/2016 | Cozens et al. | |

FOREIGN PATENT DOCUMENTS

| | | |
|---|---|---|
| JP | 2005-032159 A | 2/2005 |
| JP | 2006-243788 A | 9/2006 |
| JP | 2008-107874 A | 5/2008 |
| JP | 2011-204148 A | 10/2011 |
| KR | 10-20070013048 A | 1/2007 |
| KR | 10-1194252 B1 | 10/2012 |
| KR | 10-20120108450 A | 10/2012 |
| KR | 10-20120112297 A | 10/2012 |
| WO | 2008/123851 A1 | 10/2008 |
| WO | 2012/018614 A1 | 2/2012 |
| WO | 2012/075417 A1 | 6/2012 |
| WO | 2013/148416 A1 | 10/2013 |
| WO | 2014/089309 A1 | 6/2014 |

OTHER PUBLICATIONS

Arrington "BiiiMonk-Social Money", Jan. 20, 2006, 12 pages.
Billmonk, "BiiiMonk is now an Obopay company! Settle up online", Jan. 30, 2007,12 pages.
Billmonk "Debt Shuffling", Aug. 24, 2007, 8 pages.
Billpin "BillPin—Splitting Bills Made Easy", Jan. 15, 2013, 1 page.
Bilton "Venmo Wants Its Users to Trust Each Other", Oct. 25, 2010, 8 pages.
Bishop "Geekwire: No Joke: Google wants a patent on splitting the restaurant bill", GeekWire; [online] Retrieved from the Internet <URL:l/www.geekwire.com/2013/joke-google-seeks-patent-splitting-restaurant-bills, Oct. 2013, 18 pages.
Bittner "Should You Vacation Like a Capitalist or a Socialist", Forbes, Personal Finance [online] Retrieved from the Internet, <URL:http://www.forbes.com/sites/jonbittner/2011/12/0/do-you-vacation-like-a-capitalist-or-a-socialist>, Dec. 7, 2011, 5 pages.
Bittner "Splitwise: Announcing the Travel Calculator", Splitwise—The Official Splitwise Blog—[online] Retrieved from the Internet—<URL:http://lblog.splitwise.com/2011/12/07/announcing-the-travel-calculator, Dec. 7, 2011, 2 pages.
Bittner "Splitwise: The New Monthly Summary and Google Charts", SplitWise—The Official Splitwise Blog—[online] Retrieved from the Internet <URL:http/lblog.splitwise.com/2012/03/05/the-new-monthly-summary-and-google-charts/>, Mar. 5, 2012, 3 pages.
Bittner "SplitWise: Upcoming Redesign", Splitwise—The Official Splitwise Blog—[online] Retrieved from the Internet <URL:http://lblog.splitwise.com/2011/06/06/upcoming-redesign/>, Jun. 6, 2011, 3 pages.
Carrns "A New Tool, SplitTheRent.com for Roommates", The New York Times, Apr. 28, 2011, 4 pages.
Chavanu "3 Great Apps to Easily & Fairly Split a Bill Among Several People [iPhone]", MakeUseOf, Jan. 2, 2012, [online] Retrieved from the Internet <URL:http://www.makeuseof.com/tag/3-great-apps-easily-split-bill-people-iphone/>, 6 pages.
Cozma "Manage Housemate Expenses with Conmigo for Android", May 1, 2012, 12 pages.
Dachis "Conmigo Helps You Split Your Expense with Your Roommates", LifeHacker [online] Retrieved from the Internet <U RL: http://lifehacker.com/5843961 /con migo-helps-you-split-your -expenses-with-your-roommates>, Sep. 27, 2011, 4 pages.
Donnelly "Implementation Focus: Short Reckonings", Implementation Focus: Short Reckonings—YUI Blog—[online] Retrieved from the Internet <URL:http:/lyuiblog.com/2009/07/31/implementation-focus-short-reckonings/>, Jul. 31, 2009, 3 pages.
Falo "European Decision to Refuse issued in European Application No. 13861092.8", dated Feb. 4, 2019, 14 pages.
Falo "European Office Action issued in European Application No. 13861092.8", dated Mar. 9, 2017, 4 pages.
Falo "European Office Action issued in European Application No. 13861092.8", dated Sep. 27, 2017, 4 pages.
Falo "Extended European Search Report issued in European Application No. 13861092.8", dated Apr. 11, 2016, 8 pages.
Finovate Group Inc "Finovate Spring 2011 Video Archives» PayDivvy", Finovate Video Archives [online] Retrieved from the Internt <URL:http://www.finovate.com/apring11 vid/paydiwy.html>, Sep. 2011, 4 pages.
Gannes "Venmo's Simple, Loaded Premise: Pay Your Friends From Your Phone", Feb. 16, 2010, 10 pages.
Goldin "Office Action issued in Australian Application No. 2013201844", dated May 8, 2013, 4 pages.
Grave "Short Reckonings", Webpage for www.shortreckonings.com, [online] Retrieved from the Internet [Archived on web.archive.org on May 12, 2008] <URL:http://web.archive.org/web/20080512073234/http/lwww.shortreckonings. 2008, 1 page.
Grimm "Palm Software—DinnerDebt 1.0.2", Midwinter.com [online] Retrieved from the Internet <URL:http://web.archive.org/web/200603302007 48/http://www. m idwinter.com/palm/>, Feb. 13, 2005,1 page.
Grimm "Source Code for "DinnerDebt"", GitHub, Inc. [online] Retrieved from the Internet <URL:https://github.com/koreth/DinnerDebt>., Aug. 9, 2009, 1 page.
Ha "DevBeat—No More Deadbeat Friends: PayDivvy Launches Social Bill Service", Venturebeat [online] Retrieved from the Internet <URL:http/lventurebeat.com/2011/05/11/no-more-deadbeat-friends-pay-divvy-launches-social-bill-service/>, May 11, 2011, 5 pages.
Holly "U.S. Office Action issued in copending U.S. Appl. No. 14/822,725, filed Aug. 10, 2015", dated Apr. 15, 2019, 14 pages.
Holly "U.S. Office Action issued in copending U.S. Appl. No. 14/822,725, filed Aug. 10, 2015", dated Feb. 21, 2018, 15 pages.
Holly "U.S. Office Action issued in copending U.S. Appl. No. 14/822,725, filed Aug. 10, 2015", dated Sep. 4, 2018, 15 pages.
Houston "The Verge—Divided Bill Splitter app for iOS eases post-dining pain", The Verge [online] Retrieved from the Internet <U RL: http://www. theverge. com/apple/20 11/1 0/3/2466706/divided-bill-splitter -for -ios-hands-on>, Oct. 3, 2011, 4 pages.
IP.com "Method and System for Providing Contribution for a Purchase over a Social Network", IP.com No. IPCOM00020211 OD, Dec. 3, 2010, 3 pages.
Kawasaki "Japanese Office Action issued in Japanese Application No. 2015-503367", dated Nov. 2, 2015, 5 pages of English Translation and 5 pages of Japanese Office Action.
Kim "International Search Report and Written Opinion issued in International Application No. PCT/US2013/033000", dated Jul. 16, 2013, 12 pages.

(56) References Cited

OTHER PUBLICATIONS

KittySplit "The Easiest Way to Work Out Who Owes What. It's Free!", Web page for www.KittySplit.com [online] Retrieved from the Internet <URL:http://web.archive.org/web/20130402114401/http:/lwww.kittsplitcom>, Jan. 2012, 2 pages.
Lee "Korean Office Action issued in Korean Application No. 10-2016-7031245", dated Dec. 10, 2018, 3 pages of English Translation and 3 pages of Korean Office Action.
Lee "Korean Office Action issued in Korean Application No. 10-2016-7036763", dated Apr. 5, 2018, 3 pages of English Translation and 3 pages of Korean Office Action.
Lee "Korean Office Action issued in Korean Application No. 10-2014-7029024", dated Apr. 14, 2016, 6 pages of English Translation and 6 pages of Korean Office Action.
Lee "Korean Office Action issued in Korean Application No. 10-2015-7018073", dated Oct. 30, 2015, 4 pages of English Translation and 4 pages of Korean Office Action.
Loftus "U.S. Office Action issued in copending U.S. Appl. No. 13/436,491, filed Mar. 30, 2012", dated Apr. 11, 2013, 10 pages.
Loftus "U.S. Office Action issued in copending U.S. Appl. No. 13/436,491, filed Mar. 30, 2012", dated Feb. 20, 2014, 10 pages.
Ma "MiniMerger: Obopay Aquires Billmonk", TechCruch [online] Retrieved from the Internet <URL:http://techcrunch.com/2007/01/30/minimerger-obopay-acquires-billmonk/>, Jan. 30, 2007, 10 pages.
Madamba "U.S. Office Action issued in copending U.S. Appl. No. 13/436,491, filed Mar. 30, 2012", dated Jun. 6, 2016, 19 pages.
Madamba "U.S. Office Action issued in copending U.S. Appl. No. 13/436,491, filed Mar. 30, 2012", dated Aug. 23, 2018, 22 pages.
Madamba "U.S. Office Action issued in copending U.S. Appl. No. 13/436,491, filed Mar. 30, 2012", dated Jul. 31, 2017, 23 pages.
Madamba "U.S. Office Action issued in copending U.S. Appl. No. 13/436,491, filed Mar. 30, 2012", dated Dec. 13, 2016, 24 pages.
Madamba "U.S. Office Action issued in copending U.S. Appl. No. 13/436,491, filed Mar. 30, 2012", dated Feb. 8, 2018, 24 pages.
Moon "International Preliminary Report on Patentability issued in International Application No. PCT/US2013/033000", dated Oct. 9, 2014, 9 pages.
Nickitas-Etienne "International Preliminary Report on Patentability issued in International Application No. PCT/US2013/073342", dated Jun. 18, 2015, 9 pages.
Niquette "U.S. Office Action issued in copending U.S. Appl. No. 13/706,350, filed Dec. 5, 2012", dated Apr. 1, 2013, 13 pages.
Zhou "Chinese Office Action issued in Chinese Application No. 201380069627.6", dated Apr. 8, 2016, 10 pages of English Translation and 7 pages of Chinese Office Action.
Niquette "U.S. Office Action issued in copending U.S. Appl. No. 14/148,704, filed Jan. 6, 2014", dated Dec. 4, 2014, 7 pages.
Niquette "U.S. Office Action issued in copending U.S. Appl. No. 14/822,725, filed Aug. 10, 2015", dated Dec. 5, 2016, 11 pages.
Niquette "U.S. Office Action issued in copending U.S. Appl. No. 14/822,725, filed Aug. 10, 2015", dated Mar. 16, 2017, 11 pages.
Oh "International Search Report and Written Opinion issued in International Application No. PCT/US2013/073342", dated Apr. 9, 2014, 12 pages.
Schonfeld "Social Payment Startup Venmo Raised $1.2 Million and has a new iPhone App (TCTV)", TechCrunch [online] Retrieved from the Internet <URL:http://techcrunch.com/201 0/09/16/venmo-1-2-million-iphone/>, Sep. 16, 2010 2 pages.
Schonfeld "Social Payment Startup Venmo Raised $1.2 Million and has a New iPhone App (TCTV)", Sep. 16, 2010, 5 pages.
Siddiqui "Canada Office Action received for Canada Patent Application No. 2868941", dated May 16, 2016, 4 pages.
Siddiqui "Canada Office Action received for Canada Patent Application No. 2868941", dated Jun. 10, 2015, 3 pages.
SplitMyBill "SplitMyBill—The Tour", SplitMyBill [online] Retrieved from the Internet <URL:http://web.archive.org/web/20090403110658/http://www.splitmybill.ie/tourhtml>, Apr. 3, 2009, 10 pages.
Splitwise "Screenshot of Monthly Balances with Settlement Alarms", Splitwise [online] Retrieved from the Internet <URL:http://splitwisefiles.wordpress.com/2011/1 0/screen-shot-2011-1 0-30-at-9-39-20-pm.png?w=640&h=511 >, Oct. 30, 2011, 1 page.
Stack Exchange Inc "Tracking and Managing Group Expenditures (Google)—Patent Application—Prior Art Request", <URL:http://patents.stackexchabneg.com/questions/5182/tracking-and-managing-group-expenditures-google-patent-application-prior-a?answertab=active#tb-top>, 2013, 12 pages.
Starrett "iLounge—iPhone Gems: All 30 Tip Calculators+ Meal Splitters, Reviewed", iLounge [online] Retrieved from the Internet <URL:http://www.iloung.com/index.php.articles/comments/iphone-gems-all-30-tip-calculators-meal-splitters-reviewed/>, Aug. 29, 2008,, 23 pages.
Twitter "Tweets posted on Twitter from Shortreckonings", Twitter [online] Retrieved from the Internet <URL: https://twitter.com/shortreckonings>, May 6, 2008, 13 pages.
WeSplit.IT "An Easy to Use Bill Splitting Application", WeSplit.IT [online] Retrieved from the Internet <URL:http:/lweb.archive.org/web/200905211 04220/http://wesplit.it>, 2008, 2 pages.
Wie Betaalt Wat "Whopayswhat.nl: Settle your Joint Expenses", Frankwatching [online] Retrieved from the Internet <URL:http://www.frankwatchingcom/gespot/wiebetaaltwat-nl-verreken.je.gezamenlijke-uitgaven/>, Aug. 2010, 8 pages.
Wikipedia "Going Dutch", From Wikipedia, the free encyclopedia, Mar. 6, 2012, 5 pages.
Zhou "Chinese Office Action issued in Chinese Application No. 201380069627.6", dated Mar. 9, 2017, 6 pages of English Translation and 4 pages of Chinese Office Action.
Zhou "Chinese Office Action issued in Chinese Application No. 201380069627.6", dated Sep. 6, 2016, 7 pages of English Translation and 4 pages of Chinese Office Action.
Holly "U.S. Office Action issued in copending U.S. Appl. No. 14/822,725, filed Aug. 10, 2015", dated Sep. 23, 2019, 15 pages.
U.S. Appl. No. 13/706,350 to Narelle Cozens et al. filed Dec. 5, 2012.
U.S. Appl. No. 14/148,704 to Narelle Cozens et al. filed Jan. 6, 2014.
U.S. Appl. No. 14/822,725 to Narelle Cozens et al. filed Aug. 10, 2015.
U.S. Appl. No. 13/436,491 to Travis Harrison Kroll Green et al. filed Mar. 30, 2012.

\* cited by examiner

| User A | User B | User C |
|---|---|---|
| User B Balance: Owed $130 by User B | User A Balance: Owe $130 to User A | User A Balance: Owed $20 by User C |
| User C Balance: Owe $20 to User C | User C Balance: Owe $0 to User C | User B Balance: Owe $0 to User B |

FIG. 4

TRACKING AND MANAGING GROUP EXPENDITURES

CROSS REFERENCE TO RELATED APPLICATIONS

This application is a continuation of and claims priority to U.S. patent application Ser. No. 13/436,491, filed Mar. 30, 2012 and entitled "Tracking and Managing Group Expenditures." The entire contents of the above-identified application are hereby fully incorporated herein by reference.

BACKGROUND OF THE INVENTION

1. Field of the Invention

This invention pertains in general to payment transactions, and more specifically to tracking and managing payments by members of a group.

2. Description of the Related Art

Oftentimes, people engage in activities as a group. For example, a group of friends may go on vacation together, plan an event together, or go to dinner. When the group incurs a bill, typically one of the group members will pay the bill out of convenience and expects to be paid back by the other group members. However, some group members may not pay back their entire share of the bill or may forget and not pay back their share at all. This is unfair for the group member that paid the bill. Thus, there is a need in the art for an efficient way to track group expenditures and settle balances between group members.

BRIEF SUMMARY OF THE INVENTION

Methods, computer program products, and computer systems are described for tracking payment transaction of group users. Embodiments of the method comprise establishing a group including plurality of users. A transaction record is maintained for the group that includes a plurality of payment transactions. Each of the plurality of payment transactions involves at least one user of the group. Additionally, a balance is maintained that indicates an amount owed by a first user of the group to a second user of the group based on one or more of the plurality of payment transactions. When a settling event occurs, the balance is settled by initiating a transfer of funds between the first user and the second user.

Embodiments of the computer program product have a non-transitory computer-readable storage medium having computer executable instructions. The computer executable instructions comprise a group module that is configured to establish a group including plurality of users. A tracking module is configured to maintain a transaction record for the group that includes a plurality of payment transactions. Each of the plurality of payment transactions involves at least one user of the group. Further, a balance module is configured to maintain a balance that indicates an amount owed by a first user of the group to a second user of the group based on one or more of the plurality of payment transactions. A settlement module is configured to settle the balance by initiating a transfer of funds between the first user and the second user when a settling event occurs.

Embodiments of the computer system comprise a computer processor and a computer-readable storage medium storing computer program module configured to execute on the computer processor. The computer program modules comprise a group module that is configured to establish a group including plurality of users. A tracking module is configured to maintain a transaction record for the group that includes a plurality of payment transactions. Each of the plurality of payment transactions involves at least one user of the group. Further, a balance module is configured to maintain a balance that indicates an amount owed by a first user of the group to a second user of the group based on one or more of the plurality of payment transactions. A settlement module is configured to settle the balance by initiating a transfer of funds between the first user and the second user when a settling event occurs.

BRIEF DESCRIPTION OF THE DRAWINGS

FIG. 4 is a table illustrating balances of users of a group according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

I. Overview

Figure 1:
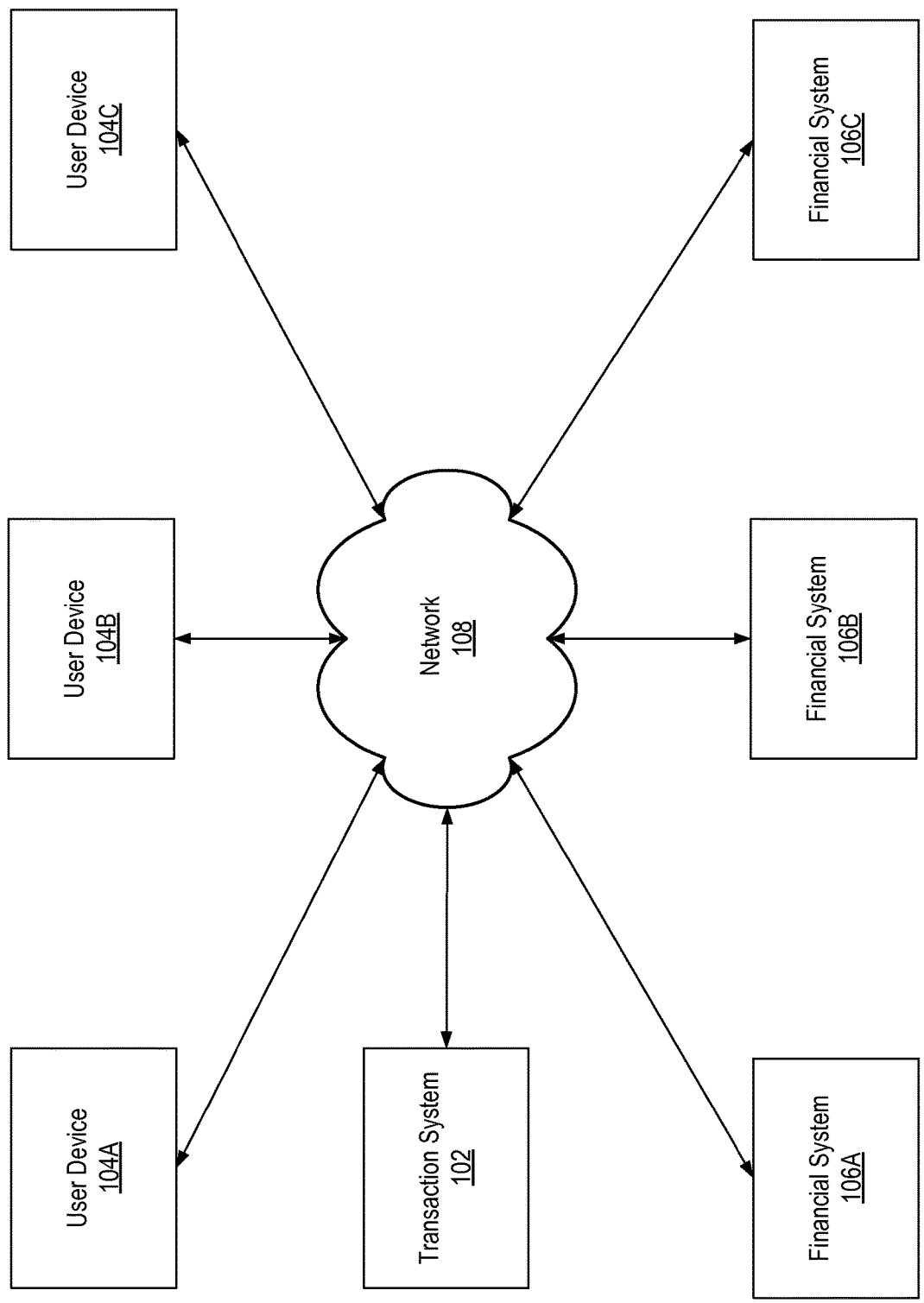
FIG. 1 is a high-level block diagram of a computing environment according to one embodiment.

FIG. 1 is a high-level block diagram of a computing environment 100 according to one embodiment. FIG. 1 illustrates a transaction system 102, three user devices 104, and three financial systems 106 connected via a network 108. Although the illustrated environment 100 only includes a select number of each entity, other embodiments can include more or less of each (e.g., more user devices 104 and financial systems 106).

FIG. 1 uses like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A," "104B," and/or "104C" in the figures).

The transaction system 102 tracks expenditures for groups and allows the settlement of balances between group members. The transaction system 102 allows users to create groups to track the expenditures of users of the groups. The transaction system 102 maintains for each group a transaction record that includes payment transactions of users of the group. When a user of a group makes a payment (e.g., to pay a restaurant bill), the transaction system 102 allows the payment transaction to be added to the transaction record of the group as an expenditure.

In one embodiment, transaction system 102 maintains balances for users of a group (e.g., amounts users owe each other) based on the payment transactions included in the transaction record of the group. The balances of the users can be settled by transferring funds between financial institution accounts of the users. The transaction system 102 manages the settling of the balances by communicating with the appropriate financial systems 106 to initiate the transfers. The settlement of balances may occur, for example, periodically (e.g., end of every month) or upon request by a user.

A user device 104 is an electronic device used by a user to communicate with the entities connected to the network 108. In one embodiment, the user devices 104 of the environment 100 include mobile computing devices, such as mobile phones, tablet computers, notebook computers, and personal digital assistants (PDAs). In one embodiment, the user devices 104 of the environment 100 include computing devices connected to the network 108 via cable connections, such as desktop personal computers.

A user can use a device 104 to make a payment to a person or an entity. A mobile user device 104 may include an application that allows a user to make mobile payments. In one embodiment, a user device 104 communicates with a checkout terminal (e.g., a mobile payment reader) to make a payment. In one embodiment, a user device 104 communicates with a payment system via the network 108 to make a payment. A payment may be made, for example, using a credit card or a transfer of funds between accounts.

In one embodiment, when a user makes a payment using a user device 104, the user device 104 transmits a message to the transaction system 102 indicating that a payment was made by the user. In one embodiment, the message includes information associated with the payment such as, when the payment was made, the recipient of the payment, and the amount of the payment.

Through a device 104 a user can communicate with the transaction system 102 to create new groups and invite users to join groups. The user can also communicate with the transaction system 102 to view the payment transactions of a group, request to add a payment transaction to the transaction record of a group, and to settle balances with users of a group.

The financial systems 106 represent the electronic systems of financial institutions that provide financial services. A financial institution may be, for example, a bank or an issuer of a credit card. Users create accounts with the financial institutions. One type of account that a user may have with a financial institution is an account in which the user may withdraw or deposit funds in the account (e.g., a savings or checking account). Another type of financial institution account that a user may have is a revolving account in which the user is granted a line of credit from which the user can borrow money for paying another entity (e.g., a credit card account).

In one embodiment, the financial systems 106 provide the transaction system 102 with information on payments users have made using their accounts with the financial institutions of the systems 106. In one embodiment, payment transaction information is provided by a financial system 106 to the transaction system 102 upon request. For example, the transaction system 102 may periodically request from a financial system 106 payment transaction information of an account of a user.

In one embodiment, when a financial system 106 receives a request for payment transaction information of an account of a user, the financial system 106 determines whether the user has authorized the transaction system 102 to receive account information. If the user has authorized the transaction system 102 to receive account information, the financial system 106 provides the requested information to the transaction system 102.

In one embodiment, instead of the information having to be requested, one or more of the financial systems 106 automatically provide payment transaction information to the transaction system 102. In one embodiment, the payment transaction information of user accounts is periodically provided by the financial systems 106 to the transaction system 102. In one embodiment, transaction information is automatically provided by a financial system 106 when a transaction occurs.

In one embodiment, the financial systems 106 process requests to transfer funds between accounts. In one embodiment, the requests are made by users through the transaction system 102 or initiated by transaction system 102. In one embodiment, a request by a user to transfer funds between accounts includes information on the account the funds are being transferred from (the transferring account), the account the funds are being transferred to (the receiving account), and the amount being transferred.

When a financial system 106 receives a request to transfer funds, the financial system 106 verifies that the requester is authorized to access the transferring account and the transferring account has sufficient funds available to complete the transfer. If the requester is authorized and the account has sufficient funds, the financial system 106 completes the transfer from the transferring account to the receiving account. The financial system 106 may have to communicate with another financial system 106 to complete the transfer if the two accounts are not with the same financial institution.

The network 108 represents the communication pathways between the transaction system 102, the user devices 104, and the financial systems 106. In one embodiment, the network 108 is the Internet and uses standard communications technologies and/or protocols. Thus, the network 108 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. In another embodiment, the entities can use custom and/or dedicated data communications technologies instead of, or in addition to, the ones described above.

II. System Architecture

Figure 2:
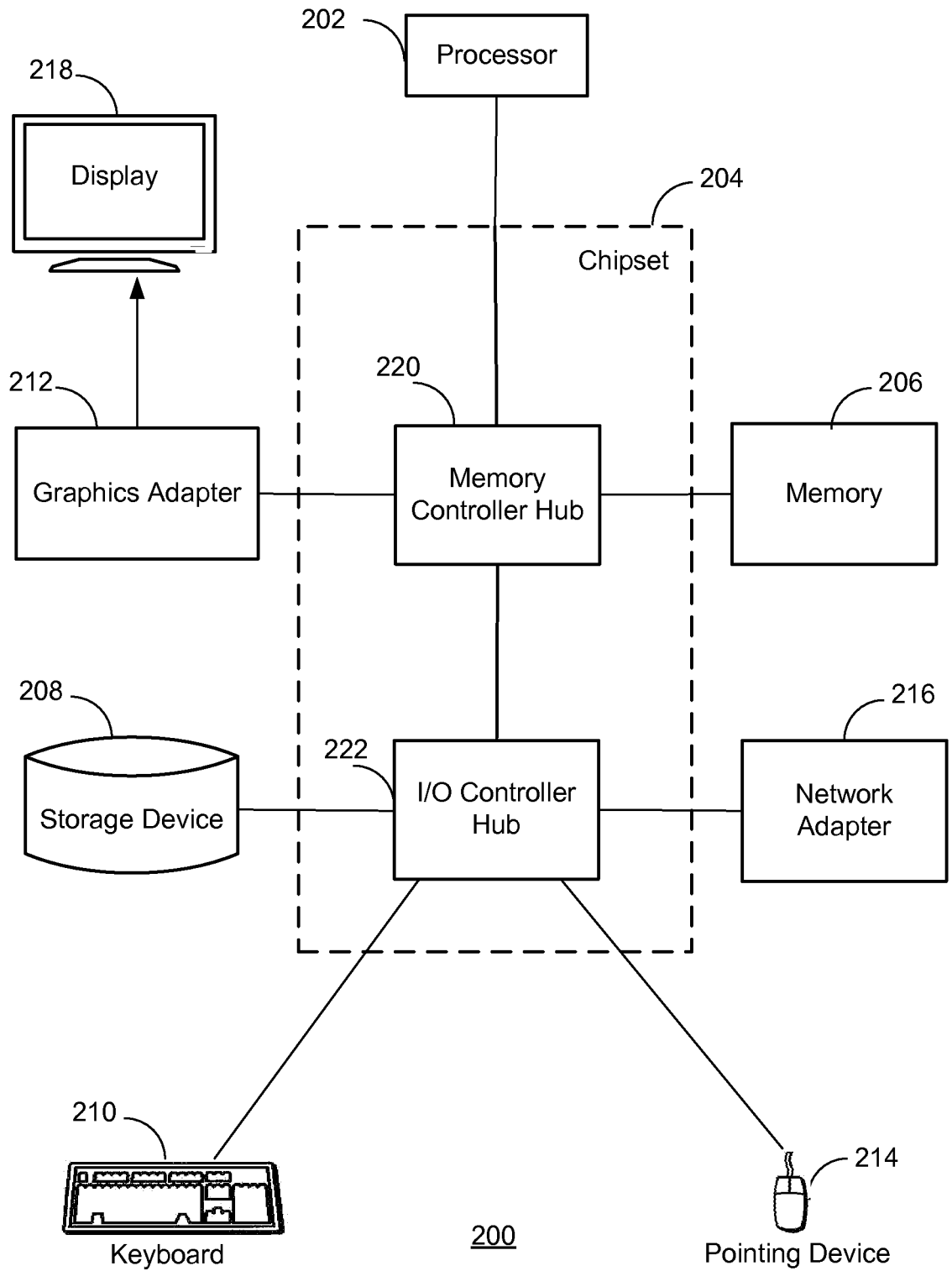
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108. Some embodiments of the computer system 200 have different and/or other components than those shown in FIG. 2.

The computer 200 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 208, loaded into the memory 206, and executed by the processor 202.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 200 used by the entities of FIG. 1 can vary depending upon the embodiment and the processing power used by the entity. For example, a user device 104 that is a mobile phone typically has limited processing power, a small display 218, and might lack a pointing device 214. The transaction system 102 and financial systems 106, in contrast, may comprise multiple blade servers working together to provide the functionality described herein.

Figure 3:
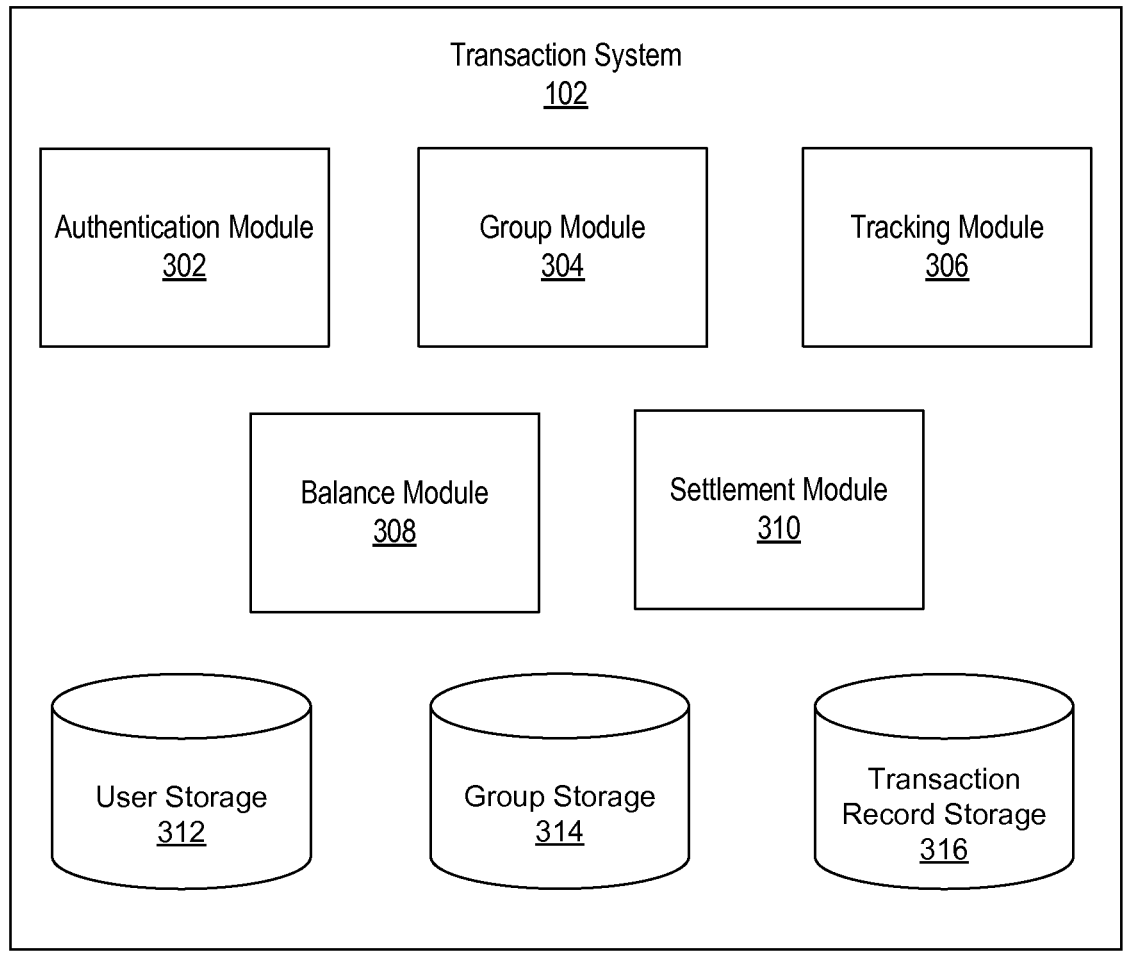
FIG. 3 is a high-level block diagram illustrating modules within a transaction system according to one embodiment.

FIG. 3 is a high-level block diagram illustrating modules within the transaction system 102 according to one embodiment. Those of skill in the art will recognize that other embodiments can have different and/or other modules than the ones described here, and that the functionalities can be distributed among the modules in a different manner.

An authentication module 302 authenticates users of the transaction system 102. In one embodiment, the authentication module 302 maintains in a user storage 312 authentication information for each user that has signed up (i.e., registered) to use the services provided by the transaction system 102. In one embodiment, the authentication information includes a user identifier and a password.

In one embodiment, when a user attempts to communicate with the transaction system 102, if the user is not logged into the system 102, the authentication module 302 presents a login page to the user via the device 104 of the user. In the login page, a user that has previously signed up with the system 102 can enter their respective authentication information. When the authentication information is entered, the authentication module 302 verifies whether information is valid. If the information is valid, the user is logged into the transaction system 102. In another embodiment, the user is automatically logged into the system 102 by the device 104.

In one embodiment, if a user is communicating with the transaction system 102 and has not previously signed up with the transaction system 102, the authentication module 302 presents the user with option of signing up to use the services of the system 102. If the user requests to sign up, the user goes through a sign up process. In the sign up process, the user provides authentication information that user wishes to use to login, as well as personal information (e.g., name, email address, phone number).

In one embodiment, in the sign up process the user provides account information of at least one financial institution account of the user from which funds can be withdrawn or deposited (e.g., to settle a balance). In one embodiment, the user provides account information of one or more financial institution accounts that the user wishes the transaction system 102 to track for payments made using the account.

The account information provided by the user for a financial institution account may include one or more of the following: the name of the financial institution, a routing transit number of the institution, a type of the account, an account number, a credit card number, and information needed to access the account (e.g., login information of the user for a website of the financial institution). In one embodiment, as part of the sign up process, when the user provides account information of a financial institution account, the user also provides authorization to access the account and/or initiate fund transfers from the account. The information received by the authentication module 302 during the sign up process is stored in the user storage 312.

A group module 304 allows registered users to create and join groups. A group is made up of a number of users of the system 102 that wish to track certain expenditures together. A group may be created to track, for example, the expenditures of users taking a trip together, the expenditures of users living together, the expenditures of users at an event or in putting together an event.

When a registered user requests to create a new group, the group module 304 creates the new group in a group storage 314. The group storage 314 includes information on each group created by the group module 304 and information on which users are part of each group. If the user requests to invite select users of the system 102 to join the group, the group module 304 transmits a message to each selected user inviting the user to join the group. In one embodiment, the transmitted message is a digital message, such as an email, a Short Message Service (SMS) message, or a Multimedia Messaging Service (MMS) message. If an invited user accepts the invitation to join the group, the group module 304 updates the group storage 314 to indicate that the user is a member of the group.

In one embodiment, a registered user can request to invite a non-registered user (i.e., a user that has not signed up to use the transaction system 102) to join a group. In one embodiment, the transaction system 102 is integrated with a social networking system and a registered user can request to invite a user of a social network. For example, a registered user can invite his/her social networking friend to join a group. In one embodiment, if a non-registered user accepts an invitation to join a group, the user has to sign up with the system 102 in order to be able to join the group.

In one embodiment, at the request of a user, the group module 304 may create a new group in the group storage 314 by copying an existing group from another system. For example, if the user is a member of a social network group with a social networking system, the same group can be created by the group module 304 in the group storage 314. Similarly, another system (e.g., a social networking system) can create a group by copying a group from the group storage 314.

In one embodiment, when a group is created in the group storage 314, the group module 304 also creates a transaction record for the group in a transaction record storage 316. The transaction record storage 316 includes the transaction records of groups, as well as balances associated with the transaction records. The transaction record is created to track expenditures of users of the group.

In one embodiment, each group has at least one administrator. The user that requested the creation of a group is by default an administrator of the group. An administrator of a group has certain privileges that other users of the group (i.e., non-administrators) do not have. The administrator has the privileges for purposes of managing the group. The privileges of an administrator may include being able to, for example, invite users to join the group, remove users from the group, delete the group, approve the addition of payment transactions to the transaction record of the group, and remove payment transactions from the transaction record.

In one embodiment, a group administrator can add additional administrators to the group. When the group module 304 receives a request from an administrator of a group to add a user as an additional administrator, the group module 304 updates the group storage 314 to indicate that the user is an administrator of the group.

A tracking module 306 tracks payment transactions of users of the system 102. A payment transaction is a transaction where a person provides a payment to another person or entity. A payment may be made, for example, to a merchant in exchange for a good or a service. A payment may also be made as a donation.

In one embodiment, when a user of system 102 makes a payment using a user device 104 (e.g., a mobile payment), the tracking module 306 receives a notification from the device 104 with information of the payment transaction. The payment information included in the notification may include, for example, the amount of the payment, the receiver of the payment, the time, the date, and location information (e.g., location tracked by the device 104). In one embodiment, the tracking module 306 automatically adds that payment transaction to a transaction record of a group to which the user belongs if the transaction satisfies criteria established by the user for the group. For example, a user may provide as criteria for a group that payment transactions that occur between certain dates at certain locations or within a radius of a location should be added to the group.

In another embodiment, when the notification is received, the tracking module 306 transmits a message to the user device 104 inquiring as to whether the user would like to add the payment transaction as an expenditure of one of the groups to which the user belongs. In one embodiment, if the user requests to add the payment transaction to a group, the tracking module 306 automatically adds the payment transaction to the transaction record of the group in the transaction record storage 316. In another embodiment, if the user requests to add the payment transaction to a group, the tracking module 306 transmits to the user device 104 a form with multiple fields. The form is for the user to provide details of the payment transaction.

In one embodiment, the form requests information on which users of the group the transaction should be allocated to and an amount of allocation to each user. By a portion of transaction being allocated to a user it means that the user is responsible for part of the transaction. The amount of allocation to a user may be, for example, a percentage of the payment or a monetary amount.

As an example, assume that a group is created to track and manage the expenditures of four friends (Friends 1-4) while on vacation in Miami. While on vacation, one of the days only three of the friends (Friends 1-3) go eat lunch at a restaurant because Friend 4 is not hungry at the time. The bill for lunch is $60 and Friend 1 pays the bill using a mobile payment service available on his device 104. Friend 1 adds the lunch as an expenditure of the group. When the form is presented to Friend 1 for the lunch, Friend 1 indicates that the lunch should be allocated to Friends 1-3. The lunch is not allocated to Friend 4 because Friend 4 did not participate in the lunch. Further, Friend 1 provides the following amounts of allocation in the form: Friend 1 $25, Friend 2 $16, and Friend 3 $19. In this example, the amount of allocation for each friend is based on what each friend ordered during lunch.

Other information that may be requested by the form for the payment transaction may include the amount of the payment, the entity to whom the payment was made (e.g., name of a merchant), date of the payment, a short description of the payment transaction, and the user of the group that made the payment. In one embodiment, some of the fields are automatically filled by the tracking module 306 based on information received from the device 104 of the user. When the form is completed and submitted by the user, the tracking module 306 updates the transaction record storage 316 to add the payment transaction to the transaction record of the group along with the information provided in the form.

In one embodiment, prior to adding a payment transaction to a transaction record of a group, an administrator of the group has to approve the addition of the transaction. In one embodiment, when a payment transaction is added to a transaction record of a group, users of the group are notified of the addition. For example, the users of the group, as well as other people may be notified via a social networking system (e.g., the addition of the transaction can be shared in a social network feed). In one embodiment, when a payment transaction is added to a transaction record of a group, a user of the group can object to the transaction. A user may object, for example, because the payment transaction was not an expenditure of the group or was allocated to the wrong users. If a user objects, the tracking module notifies an administrator of the group of the objection. The administrator determines whether to maintain, adjust, or remove the payment transaction. If the administrator requests to adjust or remove the payment transaction, the tracking module 306 updates the transaction record according to the instructions provided by the administrator.

In one embodiment, for each user of the system 102 that has provided information of a financial institution account that the user would liked tracked, the tracking module 306 periodically obtains payment transaction information from the financial system 106 of the account. The information obtained is regarding recent payments made using the account (i.e., payments made since the previous time information was obtained by the tracking module 306). In one embodiment, the tracking module 306 obtains the payment transaction information using access information provided by the user to the system 102. The access information maybe, for example, a login identifier and password of the user for the financial system 106.

For each payment transaction obtained from the financial system 106, the tracking module 306 determines whether the payment transaction has already been added to a group to which the user belongs. In one embodiment, if a payment transaction has not been added to a group and the transaction satisfies the criteria established by the user for a group, the tracking module 306 automatically adds that payment transaction to the group. In another embodiment, if at least one of the payment transactions has not been added to a group, the tracking module 306 transmits a message to the user. The message inquires from the user if he/she would like to add any of the payment transactions not previously added as an expenditure of one of the groups to which the user belongs.

If the user requests to add a payment transaction to a group, the tracking module 306 adds the transaction as described above.

In one embodiment, a user of the system 102 can manually initiate the addition of a payment transaction to a group. A user may manually initiate the addition of a transaction, for example, if the user makes a payment with cash. When the tracking module 306 receives from a device 104 of a user a request to manually add a payment transaction. The tracking module 306 transmits to the device 104 a form similar to the form described above. When the form is completed and submitted by the user, the tracking module 306 adds the transaction to a transaction record of a group identified by the user.

The balance module 308 updates the balances of groups. In one embodiment, for each transaction record in the transaction record storage 316 a total balance is maintained. In one embodiment, the total balance of a group transaction record is a summation of the payment amounts of the payment transactions included in the transaction record of the group (i.e., the amount spent by users of the group).

When the tracking module 306 adds a payment transaction to a transaction record of a group, the balance module 308 retrieves from the transaction record storage 316 the total balance of the transaction record. The tracking module 306 identifies a payment amount of the transaction and determines a new value for the total balance by summing the payment amount with the current value of the total balance. The balance module 308 updates the total balance in the transaction record storage 316 with the determined new value.

In one embodiment, for each user of a group, the balance module 308 maintains individual balances under the transaction record of the group. Each individual balance indicates an amount that the user is owed or owes another user of the group based on the transactions included in the transaction record of the group. FIG. 4 includes a table 400 that illustrates, as an example, the individual balances of three users (Users A-C) that are part of a group. Each column of the table 400 includes the individual balances of one of the users. For example, column 402 includes the individual balances of User A. In this example, User B owes User A $130 and User C is owed $20 by User A. Columns 404 and 406 respectively include the individual balances of User B and User C.

In one embodiment, when the tracking module 306 adds a payment transaction to a transaction record of a group, the balance module 308 identifies to which users the transaction has been allocated. The balance module 308 updates the individual balances of the identified users in the storage 316 based on which user made the payment of the transaction and the amounts allocated to the identified users for the transaction.

For example, continuing with the example of FIG. 4, assume that Users A-C have drinks at a bar and User B pays a bill of $45 for the drinks. User B adds the payment transaction as an expenditure of the group and allocates $15 of the transaction to User A, $20 to User B, $10 to User C. In this example, the balance module 308 would update the individual balances of Users A-C to indicate that User B now owes $115 to User A ($130-$15) and User C owes $10 to User B ($0+$10).

The settlement module 310 provides access to information stored in the transaction record storage 316 and allows users to settle their balances. In one embodiment, when a user requests through a device 104 the transaction record of a group to which the user belongs, the settlement module 310 retrieves the transaction record from the transaction record storage 316 and transmits the record to the device 104 for display to the user. In one embodiment, the settlement module 310 additionally transmits the total balance of the transaction record. In one embodiment, when a user of a group requests, the individual balances of one or more users within the group, the settlement module 310 retrieves the requested balances from the record storage 316 and transmits the balances to the device 104 of the user.

In one embodiment, the settlement module 310 automatically settles the individual balances of users within a group when a settling event occurs. In embodiment, the settling event is set by a user of the group (e.g., an administrator of the group). The settling event may be, for example, a certain date being reached (e.g., the first or last of the month), a user of the group (e.g., an administrator) requesting the settling, or the total balance of the group transaction record reaching a set amount.

To settle the individual balances of users within a group, the settlement module 310 identifies each individual balance where a user of the group (debtor) owes another group user (debtee) money. For each identified balance, the settlement module 310 retrieves from the user storage 312 account information of a financial institution account provided by the debtor for settling balances. Additionally, the settlement module 310 retrieves account information of an account provided be the debtee for settling balances. The settlement module 310 uses the retrieved account information to communicate with the appropriate one or more financial systems 106 to transfer the amount of the balance from the account of the debtor to the account of the debtee.

In one embodiment, instead of the individual balances of users within a group being automatically settled at once when a settlement event occurs, each user controls when their respective individual balances are settled. In one embodiment, at any time a user can request from the settlement module 310 to transfer funds to the account of another user to settle a balance. When the settlement module 310 receives such a request, the settlement module 310 communicates with the appropriate one or more financial systems to complete the transfer.

III. Process

Figure 5:
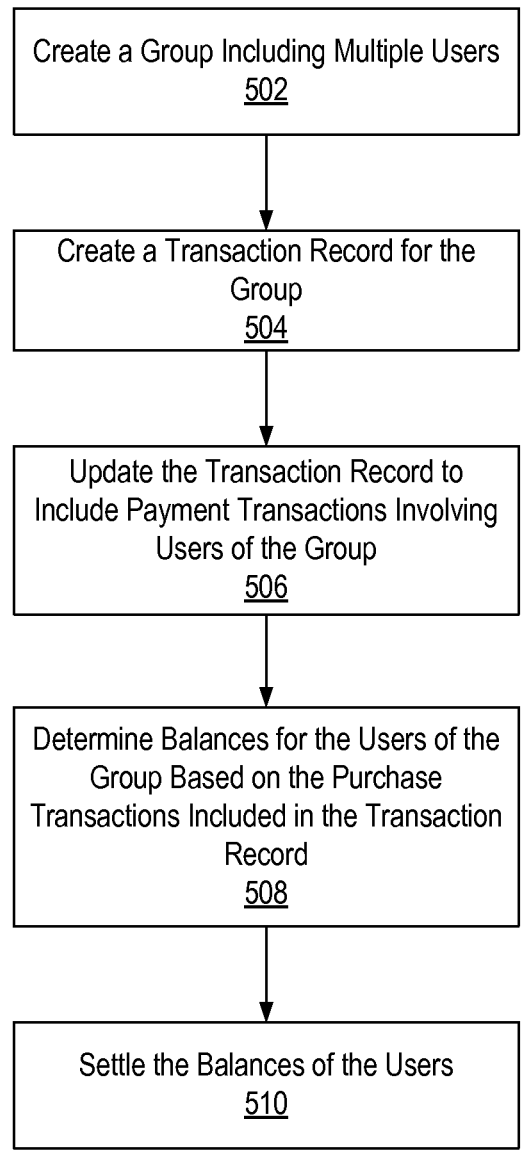
FIG. 5 is a flow chart illustrating the operations of the transaction system according to one embodiment.

FIG. 5 is a flow chart 500 illustrating the operations of the transaction system 102 according to one embodiment. Those of skill in the art will recognize that other embodiments can perform the steps of FIG. 5 in different orders. Moreover, other embodiments can include different and/or additional steps than the ones described here.

Assume for purposes of this example that a user of the transaction system 102 has requested the creation of a group to track the expenditures of multiple users. Based on the request, the transaction system 102 creates 502 a group that includes the multiple users. The transaction system 102 creates 504 a transaction record for the group.

The transaction system 102 updates 506 the transaction record to include payment transactions. Each transaction added to the record involves at least one user of the group. A user is involved in a transaction if the user is at least partially responsible for the transaction (e.g., an amount of the transaction has been allocated to the user). The transaction system 102 determines 508 balances for the users of the group based on the payment transactions included in the transaction record. In one embodiment, a balance describes an amount a user of the group is owed or owes another user. The transaction system 102 settles 510 the balances of the users. In one embodiment, the balances are settled when a settlement event occurs.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The disclosure of the present invention is intended to be illustrative, but not limiting, of the full scope of the invention, which is set forth in the following claims.

The invention claimed is:

1. A computer-implemented method to track payment transactions and allocate responsibility among a group of members, comprising:
    establishing, by a computer system, a group comprising a plurality of members;
    establishing, by the computer system, payment transaction criteria for the group based at least in part on a range of transaction dates;
    generating, by the computer system, a group transaction record comprising an allocation of responsibility among the members of the group based on a plurality of payment transactions between the group and one or more third parties meeting the payment transaction criteria, each of the payment transactions in the group transaction record identifying one or more of the members paying for the respective payment transaction, an amount of the respective payment transaction, and one or more of the members participating in the respective payment transaction;
    maintaining, by the computer system, respective balance records between each respective pair of the members of the group based on the allocation of responsibility in the group transaction record; and
    upon a settlement event, settling, by the computer system, each of one or more of the respective balance records between respective pairs of the members according to the allocation of responsibility by initiating fund transfers between the members.

2. The computer-implemented method of claim 1, wherein the generating of the group transaction record further comprises obtaining one or more of the payment transactions from at least one of a payment device of at least one of the members or a user account of at least one of the respective members.

3. The computer-implemented method of claim 2, wherein the obtaining one or more of the payment transactions further comprises:
    querying, by the computer system, the user account of at least one of the respective members periodically to obtain one or more of the payment transactions; and
    receiving, by the computer system, one or more of the payment transactions from the user account in response to the querying.

4. The computer-implemented method of claim 1, wherein the payment transaction criteria is further established based on an approval of a respective one of the payment transactions as a group transaction for the group by at least one of the members other than the one or more of the members paying for the respective one of the payment transactions.

5. The computer-implemented method of claim 1, wherein the generating the group transaction record comprises notifying each of the members of each new payment transaction.

6. The computer-implemented method of claim 1, wherein the settlement event occurs based on one or more of an end date being reached, at least one of the members requesting settlement, or a total balance reaching a set amount.

7. The computer-implemented method of claim 1, wherein the establishing of the payment transaction criteria further comprises establishing the payment transaction criteria based on transaction location.

8. A computer-implemented method to track payment transactions and allocate responsibility among a group of members, comprising:
    establishing, by a computer system, a group comprising a plurality of members;
    establishing, by the computer system, payment transaction criteria for the group based at least in part on a transaction location;
    generating, by the computer system, a group transaction record comprising an allocation of responsibility among the members of the group based on a plurality of payment transactions between the group and one or more third parties meeting the payment transaction criteria, each payment transactions in the group transaction record identifying one or more of the members paying for the respective payment transaction, an amount of the respective payment transaction, and one or more of the members participating in the respective payment transaction;
    maintaining, by the computer system, respective balances for each respective pair of the members based on the allocation of responsibility from the group transaction record; and
    upon a settlement event, settling, by the computer system, each of one or more of the respective balances between respective pairs of the members according to the allocation of responsibility by initiating fund transfers between the members.

9. The computer-implemented method of claim 8, wherein the generating of the group transaction record further comprises obtaining one or more of the payment transactions from at least one of a payment device of at least one of the members or a user account of at least one of the respective members.

10. The computer-implemented method of claim 9, wherein the obtaining one or more of the payment transactions further comprises:

querying, by the computer system, the user account of at least one of the respective members periodically to obtain one or more of the payment transactions.

11. The computer-implemented method of claim 8, wherein the payment transaction criteria is further established based on an approval of a respective one of the payment transactions as a group transaction for the group by at least one of the members.

12. The computer-implemented method of claim 8, wherein the settlement event occurs based on one or more of an end date being reached, at least one of the members requesting settlement, or a total balance reaching a set amount.

13. The computer-implemented method of claim 8, wherein the establishing of the payment transaction criteria further comprises establishing the payment transaction criteria based on a range of transaction dates.

14. A system to track payment transactions and allocate responsibility among a group of members, comprising:
  a storage device; and
  at least one processor device communicatively coupled to the storage device that executes instructions from the storage device that cause the system to:
  establish a group comprising a plurality of members;
  establish payment transaction criteria based on at least one of a range of transaction dates or a transaction location;
  generate a group transaction record comprising an allocation of responsibility among the members of the group based on a plurality of payment transactions between the group and one or more third parties meeting the payment transaction criteria, each of the payment transactions in the group transaction record identifying one or more of the members paying for the respective payment transaction, an amount of the respective payment transaction, and one or more of the members participating in the respective payment transaction;
  maintain respective balances for each respective pair of the members of the group based on the allocation of responsibility from the group transaction record; and
  upon a settlement event, settle each of one or more of the respective balance records between respective pairs of the members according to the allocation of responsibility by initiating fund transfers between the members.

15. The system of claim 14, wherein the generating of the group transaction record further comprises obtaining one or more of the payment transactions from at least one of a payment device of at least one of the members or a user account of at least one of the respective members.

16. The system of claim 15, wherein the obtaining one or more of the payment transactions further comprises:
  periodically querying the user account of at least one of the respective members to obtain one or more of the payment transactions; and
  receiving one or more of the payment transactions from the user account in response to the querying.

17. The system of claim 14, wherein the payment transaction criteria is further established based on an approval of a respective one of the payment transactions as a group transaction for the group by at least one of the members other than the one or more of the members paying for the respective one of the payment transactions.

18. The system of claim 14, wherein generating the group transaction record comprises notifying each of the members of each new payment transaction.

19. The system of claim 14, wherein the settlement event occurs based on one or more of an end date being reached, at least one of the members requesting settlement, or a total balance reaching a set amount.

20. The computer-implemented method of claim 1, further comprising:
  in response to determining that a completed payment transaction meets the payment transaction criteria, updating, by the computer system, the group transaction record to include the completed payment transaction and updating one or more of the respective balance records between the respective members.

* * * * *